United States Patent [19]
Gutoski et al.

[11] 3,709,650
[45] Jan. 9, 1973

[54] PRESS FOR USE IN THE MOLDING OF PARTS

[75] Inventors: Jerome Gutoski; Alan J. Baillie, both of Kitchener, Ontario, Canada

[73] Assignee: Electrohome Limited, Kitchener, Ontario, Canada

[22] Filed: Nov. 5, 1970

[21] Appl. No.: 87,159

[52] U.S. Cl. .................. 425/367, 425/373, 100/153
[51] Int. Cl. ......... B29c 3/02, B29c 15/00, B29d 7/14
[58] Field of Search ....... 100/153, 154, 171; 18/16 R; 425/367, 363, 373

[56] References Cited

UNITED STATES PATENTS

| | | |
|---|---|---|
| 2,254,860 | 9/1941 | Rose ........................... 100/153 UX |
| 2,376,494 | 5/1945 | Larabee ........................... 100/153 |
| 3,045,586 | 7/1962 | Blood ........................... 100/154 |
| 3,199,440 | 8/1965 | Banks ........................... 100/153 |
| 1,086,097 | 2/1914 | Swift, Jr. ........................... 100/153 X |
| 2,624,391 | 1/1953 | Lamport ........................... 100/171 X |
| 3,515,056 | 6/1970 | Johnson ........................... 100/153 X |

Primary Examiner—Robert L. Spicer, Jr.
Attorney—Sim & McBurney

[57] ABSTRACT

A press for applying pressure to an object, typically a mold, moving through it includes cooperating rollers and back-up means to apply pressure to the object during the passage through the mold. A group of the rollers may be moved further away from the back-up means so that an object may be loaded in the press.

3 Claims, 5 Drawing Figures

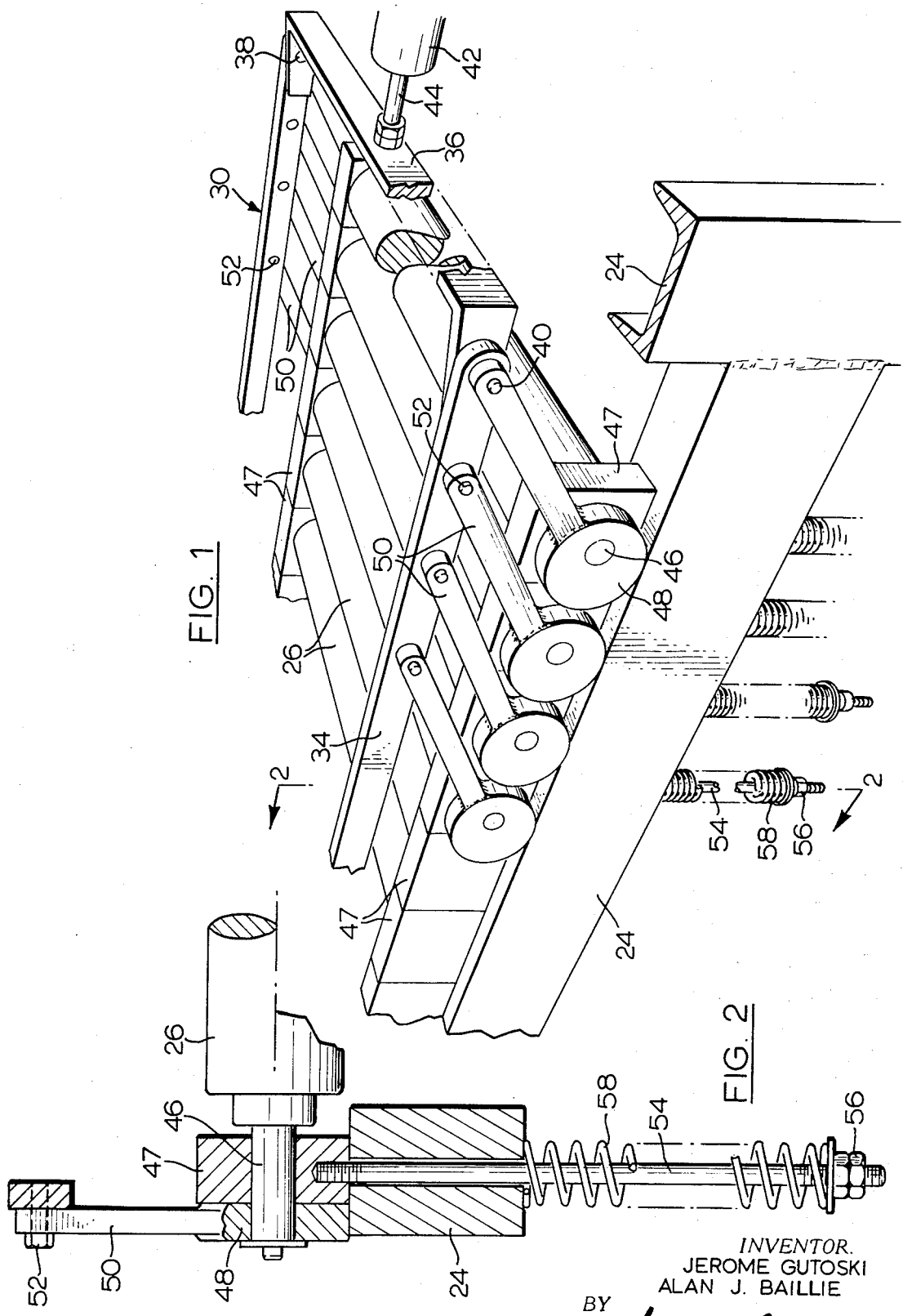

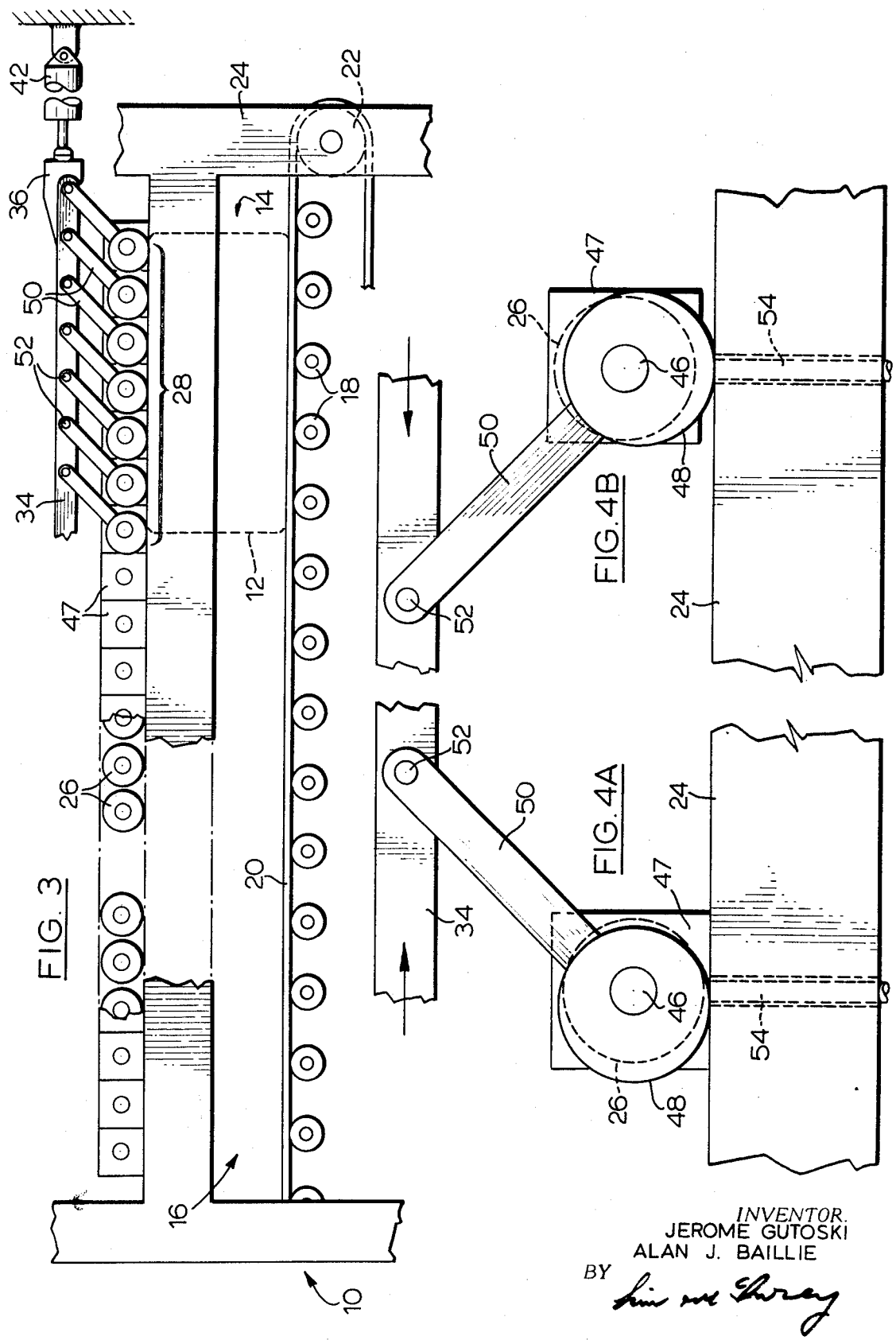

PRESS FOR USE IN THE MOLDING OF PARTS

This invention relates to a press, more particularly to a press for applying pressure to an object moving therethrough.

In the formation of molded foamed synthetic polymeric material objects, the unfoamed reaction mixture is fed into the mold cavity of a mold. The mold generally consists of two sections which may be opened to allow the unfoamed mixture to be fed in and to permit removal of the finished foamed product. The two halves of the mold are closed and held together while the mixture foams and cures. The mold parts then are separated and the resulting product removed. The plates of the mold may be coated by a release material to facilitate removal of the product from the mold.

Many objects of decorative and constructional use are formed from foamed polyurethanes. Such foamed polyurethanes may be formed from poly-isocyanates and active hydrogen containing materials. The foaming may be achieved using chemical foaming agents which release gases under the reaction conditions.

The two halves of the mold may be held together during the foaming using clamps or, more usually where mass production is required, press equipment including upper and lower parallel sets of rollers between which the mold is inserted. The rollers apply pressure to the mold and maintain the mold in a closed position during the foaming and curing of the reaction mixture. A conveyor belt generally in contact with the lower set of rollers is used to convey the mold through the press. Molds may be continuously fed to the press, so that a plurality of molds are passing through the press at any given time.

This type of arrangement is satisfactory with small molds, but with larger molds difficulties often are encountered. The main problem is that as the mold is fed between the rollers, the polymerization and foaming operations already have begun and often while the leading portion of the mold is adequately subjected to pressure between the rows of rollers, the rear portion is not so subjected to pressure, and the pressure built up inside the mold by the polymerization and foaming processes may force apart the mold parts before this portion can be contacted by the rows of rollers, thereby resulting in the loss of material and the formation of a poorly molded product.

The present invention overcomes this disadvantage in that the mold may be fed to the press so that all parts of the mold may be subjected to pressure between the rollers simultaneously.

The invention is illustrated by the accompanying drawings, in which:

FIG. 1 is a perspective view of one embodiment of the invention;

FIG. 2 is a cross-section taken along line 2—2 of FIG. 1;

FIG. 3 is a side elevational view of the embodiment of FIG. 1; and

FIGS. 4A and 4B are close-ups of two positions of part of the embodiment of FIG. 1.

In the drawings, a press 10 for applying pressure to an object 12, typically a two-part mold for foamed polyurethane products, moving from one end 14 to the other 16 includes a back-up device consisting of a plurality of rollers 18 positioned beneath and in contact with a conveyor belt 20.

The conveyor belt 20 may be moved in any convenient manner so that the object 12 is moved through the press 10. The belt is wrapped around end rollers 22, only one of which is shown, and which are mounted in frame member 24. One of rollers 22 may be driven by any suitable means.

A further plurality of rollers 26 are positioned in vertically spaced relation from the belt 20. The object 12 is received between the rollers 26 and the belt 20 and has pressure applied thereto by the two sets of rollers.

The invention is illustrated with the back-up device consisting of a belt 20 and rollers 18 and the rollers 26 in spaced-apart relationship above the belt. It is possible to modify this arrangement within the scope of the invention. For example, the rollers 26 may be spaced apart from the back-up device and located therebelow, with the conveyor belt located below and in touching relationship with the rollers 18. Alternatively, the belt may be located in touching relationship with the rollers 26.

It also is possible to omit the belt altogether and utilize another arrangement for moving the object through the press. The rollers 18 may be replaced by other suitable means, so that pressure is applied to an object received between the rollers 26 and the back-up device.

Further, the invention is illustrated with the rollers 18 located in one plane and the rollers 26 located in another plane parallel to the one plane. This arrangement represents the preferred embodiment whereby a uniform pressure is maintained on the object during its passage through the press. Such uniform pressure may be achieved without maintaining the rollers 18 and 26 in parallel planes. Such uniform pressure can be achieved simply by maintaining individual spaced-apart pairs of rollers equidistantly displaced. Also, the planes are shown to extend substantially horizontally. This may be readily modified as required.

In certain operations, it may be desirable to apply a non-uniform pressure to the object moving through the press, and this may be readily achieved by varying the distance between the rollers 26 and the back-up device, as desired.

In order to allow an object to be placed wholly within the press prior to the application of pressure, a group 28 of the rollers 26 are vertically movable away from the belt 20.

This movement may be achieved as can be seen especially in FIG. 1, by the provision of a frame 30 including parallel arms 32 and 34 and a generally U-shaped cross-piece 36 to which the arms are pivoted at 38 and 40 respectively. The cross-piece 36 is connected via a connecting rod 44 to a hydraulically operated piston (not shown) in a cylinder 42.

Each roller of the group 28 of rollers at each end thereof has an axle 46 which passes through a square bearing block 47 and is received in a circular cam 48. Only one side is shown in the drawings but the arrangement is the same at both sides.

The axle 46 is offset from the center of the cams 48. The cams 48 are attached to arms 50 which are pivotally connected to the arms 32 and 34 at 52. The cams 48 bear against the upper surface of the frame member 24.

Each block 47 is connected to a rod 54 which passes through the frame member 24 and terminates in locking nuts 56. Positioned between the underside of the frame member 24 and the locking nuts 56 and around each rod 24 are compression springs 58.

The arrangement illustrated represents only one way in which movement of a group 28 of the rollers 26 away from the back-up device may be achieved. Clearly, other arrangements are possible to achieve the same effect.

In operation, upon actuation of the hydraulic piston, the arms 32 and 34 move to the left as seen in FIGS. 1 and 3 causing the arms 50 to pivot about the pivot pins 52. As the arms pivot, the cams 48 rotate about the axles 46, bearing against the upper surface of the frame member 24. As the cams rotate, because of the eccentric position of the axles 46, the blocks 47 rise against the action of the springs 58, thereby moving the group 28 of rollers away from the belt 20. The hydraulic piston continues to operate until the position of maximum eccentricity is achieved. The extreme positions are shown in FIGS. 4A and 4B.

In FIG. 4A, the relative positions of block 47, cam 48, axle 46 and roller 26 are shown at the start position where the rollers 28 are contained in the same plane as the other rollers 26. In FIG. 4B, the relative positions of these elements are shown at the point of maximum displacement of the arms 32 and 34. It will be seen by comparison of FIGS. 4A and 4B that all of the rollers 28 have moved away from the belt 20 and therefore a large mold may be loaded into the press below the group 28 of rollers 26.

After positioning of the mold, the hydraulic piston 42 again may be actuated whereupon the arms 32 and 34 will return to their original position. As the cams 48 rotate about the axles 46, the springs 58 return the rollers of group 28 to a position where they are in engagement with the mold 12.

The group 28 of rollers therefore move between two positions. In the first position, the group of rollers along with others of the rollers 26 in cooperation with the back-up device apply pressure to an object, for example, a mold, located between the rollers and the back-up device. In the second position, the group 28 is located further away from the back-up device than in the first position, so that the long mold to which pressure is to be applied may be loaded into the press 10.

Modifications are possible within the scope of the invention.

What we claim is:

1. In a press for applying pressure to an object moving through the press from one end thereof to the other, back-up means, a plurality of rollers located in spaced-apart relationship with said back-up means, said back-up means and said plurality of rollers being adapted to receive therebetween and apply pressure to an object positioned between said rollers and said back-up means, means associated with a group of said rollers located adjacent said one end of said press to move said group rollers between first and second positions, in aid first position said group of rollers being adapted along with others of said plurality of rollers and in cooperation with said back-up means to apply pressure to an object located between said rollers and said back-up means, in said second position said group of rollers being located further away from said back-up means than in said first position thereof, whereby an object to which pressure is to be applied by others of said plurality of rollers may be loaded into said press, said means associated with said group of rollers comprising a frame including generally parallel arms terminating in a cross-member joining said arms, means for moving said frame, a plurality of elongated connectors pivotally connected to said arms adjacent one end thereof and to cams adjacent the other end thereof, each individual member of said group of rollers being connected to one such cam, and surfaces engageable with said cams, said cams turning relative to said surfaces upon movement of said frame between two positions, in one of said positions said group of rollers being in said first position and in the other of said positions, said group of rollers being in said second position.

2. The press of claim 1 wherein said rollers have axles eccentrically journalled in said cams.

3. In a press for applying pressure to an object moving through the press from one end thereof to the other, back-up means, a plurality of rollers located in spaced-apart relationship with said back-up means, said back-up means and said plurality of rollers being adapted to receive therebetween and apply pressure to an object positioned between said rollers and said back-up means, means associated with a group of said rollers located adjacent said one end of said press to move said group of rollers between first and second positions, in said first position said group of rollers being adapted along with others of said plurality of rollers and in cooperation with said back-up means to apply pressure to an object located between said rollers and said back-up means, in said second position said group of rollers being located further away from said back-up means than in said first position thereof whereby an object to which pressure is to be applied by others of said plurality of rollers may be loaded into the press, said means associated with said group of rollers comprising a frame including generally parallel arms terminating in a cross-member joining said arms, means for moving said frame, a plurality of elongated connectors pivotally connected to said arms adjacent one end thereof and to cams adjacent the other end thereof, each individual member of said group of rollers being connected to one such cam, said rollers having axles eccentrically journalled in said cams, surfaces engageable with said cams, said cams turning relative to said surfaces upon movement of said frame between two positions, in one of said latter positions said group of rollers being in said first position and in the other of said latter positions, said group of rollers being in said second position, said axles being additionally journalled in blocks, and means resiliently mounting said blocks on said press, said axles moving against the resiliency of said means upon turning of said cams as the frame moves from the first of the two positions to the second of the two positions.

* * * * *